United States Patent [19]

Hebert et al.

[11] 4,156,890

[45] May 29, 1979

[54] FLASH ASSEMBLY USING ELONGATED TRIGGER BAR

[75] Inventors: Roger T. Hebert, Peabody; Robert J. Cosco, Amesbury; Richard J. Shea, Danvers, all of Mass.

[73] Assignee: GTE Sylvania Incorporated, Stamford, Conn.

[21] Appl. No.: 845,735

[22] Filed: Oct. 26, 1977

[51] Int. Cl.² ............................................. G03B 15/02
[52] U.S. Cl. ..................................... 362/16; 362/217; 362/310; 362/347
[58] Field of Search ..................... 362/3, 16, 217, 310, 362/347

[56] References Cited

U.S. PATENT DOCUMENTS 3,237,003  2/1966  Tomkinson ............................ 362/16

*Primary Examiner*—Stephen J. Lechert, Jr.
*Attorney, Agent, or Firm*—Lawrence R. Fraley

[57] ABSTRACT

A flash assembly which uses an elongated arc discharge flash tube positioned within a reflector. A trigger bar member fits within a slot of the reflector and is located adjacent the tube. The reflector, trigger bar, and the contacts which electrically connect the electrodes projecting from the tube to a suitable power source are mounted within an insulative base. The invention is particularly suited for use within a camera assembly.

8 Claims, 3 Drawing Figures

FLASH ASSEMBLY USING ELONGATED TRIGGER BAR

BACKGROUND OF THE INVENTION

The present invention relates to flash assemblies and particularly to assemblies utilizing high voltage, arc discharge flash tubes. The invention more particularly relates to such assemblies wherein the flash tube is externally triggered.

Flashtubes generally comprise two spaced apart electrodes within a sealed glass envelope having a rare gas fill, typically xenon, at a sub-atmospheric pressure. Such lamps are connected across a large capacitor charged to a substantial potential which is, however, insufficient to ionize the xenon fill gas. Upon application of an additional pulse of sufficient voltage, the xenon is ionized and an electric arc is formed between the two electrodes, resulting in a discharge of the large capacitor through the flash tube and emission of a short burst of intense light. In many external triggering situations, the pulse voltage is applied between a trigger wire wrapped around the tube's envelope and the electrodes extending within the envelope. Usually, this form of external triggering also requires placement of a thin conductive film (e.g. tin oxide) to encompass the lamp's envelope and internally positioned electrodes. The described trigger wire is thereafter wrapped around the envelope in electrical contact with the film. The conductive film serves as a vehicle for uniformly distributing the energy from the respective high power source to effect the desired ionization. Understandably, the requirements for this film and the precisioned wrapping of the trigger wire thereabout increase the manufacturing costs of the assembly.

In recent years, it has become desirable in the photographic industry to employ the aforementioned arc discharge flash tubes within various camera assemblies. These components receive the required triggering energy from a power source located within the camera or a power pack attached thereto. The highly intense discharge from the flash tube is synchronized with the shutter mechanism of the camera to assure sufficient light when the shutter is opened.

The flash assembly of the instant invention eliminates the need for the aforedescribed conductive film and externally wrapped trigger wire. Accordingly, the present invention is more easily assembled, less expensive to manufacture, and substantially less difficult to repair or replace than known electrical flash assemblies of the prior art.

It is believed therefore that a flash assembly having the several advantageous features described above would constitute an advancement in the art.

OBJECTS AND SUMMARY OF THE INVENTION

It is a primary object of the invention to provide a flash assembly having the above several features.

According to one aspect of the invention, there is provided a flash assembly which comprises an insulative base, a reflector located on the base, a high voltage, arc discharge flash tube within the reflector, and an elongated trigger bar positioned adjacent the tube's envelope. The trigger bar serves as a vehicle in the application of an electrical pulse sufficient to initiate discharge of the stored energy within the envelope, said pulse emanating from a power source located externally of the assembly.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
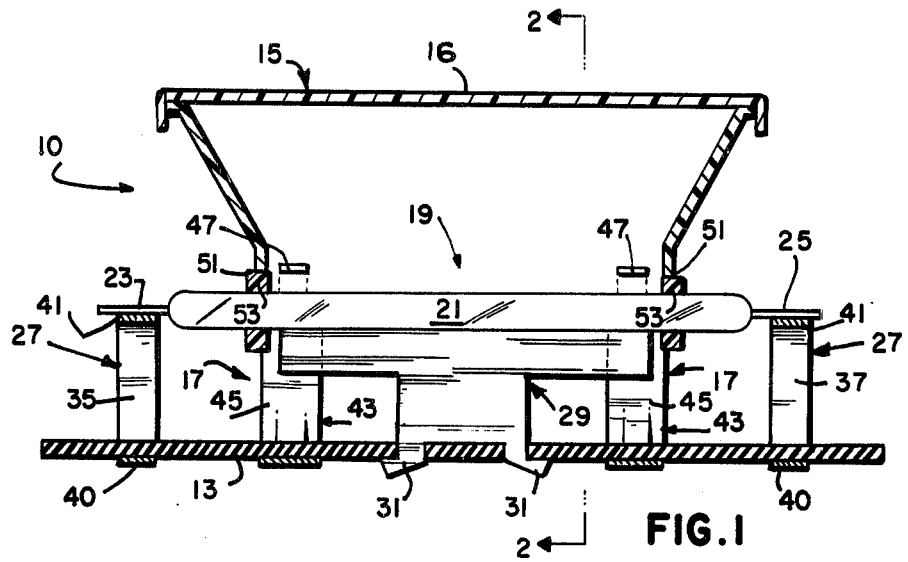
FIG. 1 is a side elevational view, partly in section, of a flash assembly in accordance with a preferred embodiment of the invention.

In FIG. 1 is shown a flash assembly 10 in accordance with a preferred embodiment of the invention. Assembly 10 is particularly suited for use within an electronic camera assembly (not shown) and may be readily connected to the power source or package normally associated with such assemblies. The light output of assembly 10 is contingent upon the energy discharged into the assembly's flash tube (to be described) and is preferably within the range of about 10 to 60 joules. Accordingly, the invention is especially suited for use in conjunction with cameras utilizing the more recently developed "fast" films. It is to be understood however, that flash assembly 10 may also be employed in other applications including warning systems, reprographic machines, etc. Typically, the invention provides the above output when triggered by a pulse source of several thousand volts (e.g. 3.8 kilovolts) after a capacitor voltage of approximately 240 volts has been applied to the light source.

Figure 2:
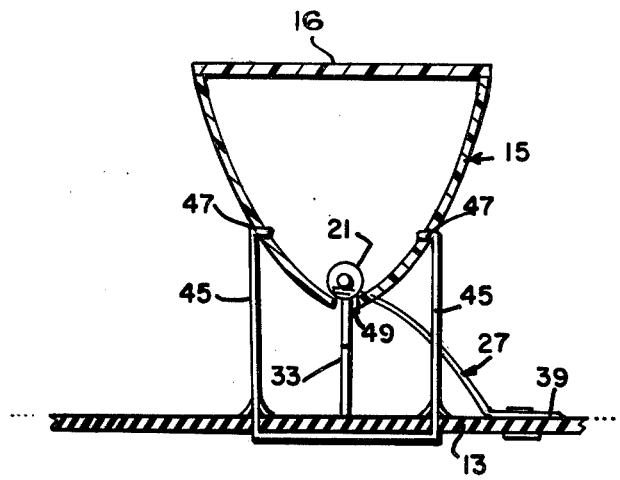
FIG. 2 is an end elevational view as taken along the line 2—2 in FIG. 1.
Figure 3:
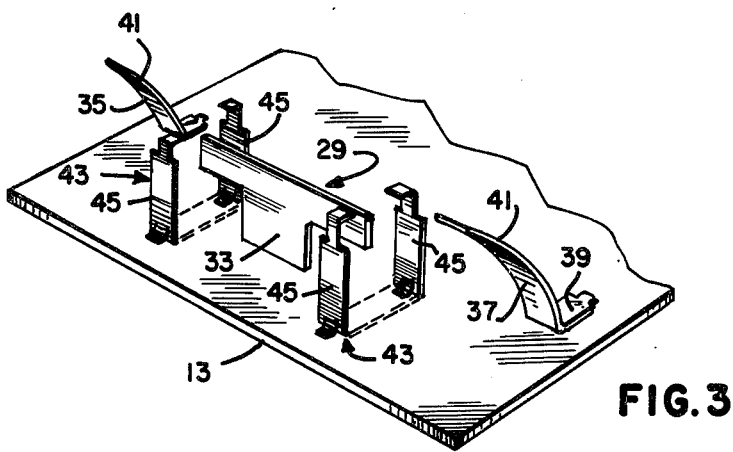
FIG. 3 is an isometric view of the invention excluding the flash tube and reflector components.

Assembly 10 includes an electrically insulative base 13, a reflector 15 spacedly oriented from base 13 and means 17 for mounting reflector 15 at the illustrated spacing from base 13. A high voltage, arc discharge flash tube 19 includes an elongated, light-transmitting envelope 21 having a pair of spaced apart electrodes 23 and 25 projecting from opposing ends thereof. A portion of envelope 21 is located within reflector 15 in order that the light output from tube 19 will be concentrated in a substantially singular direction. In the embodiment of FIGS. 1 and 2, this direction is upward. Reflector 15 is preferably a metallized (e.g. aluminized) plastic member and includes a light-transmitting cover 16 to prevent dust and similar particles from adversely affecting the reflecting properties of the reflector. As shown in FIGS. 1 and 2, the plastic member and cover 16 define a singular, elongated chamber within the reflector. The preferred plastic material for reflector 15 is Lexan. Cover 16 is preferably transparent polystyrene.

Assembly 10 further includes means 27 for electrically connecting electrodes 23 and 25 to a suitable power source (not shown) located external of the assembly. This power source provides the previously defined capacitor voltage (e.g. 240 volts) to electrodes 23 and 25, said voltage insufficient to ionize the inert gas (e.g. xenon) within tube 19. Application of the high voltage electrical pulse sufficient to ionize the tube's gas and thus initiate discharge of an arc therein between electrodes 23 and 25 is accomplished by providing a substantially solid, elongated trigger bar 29 adjacent envelope 21. Bar 29 is adapted for being electrically connected to a high voltage power source (not shown) positioned external of assembly 10. This source supplies the desired high voltage pulse to trigger bar 29 via a pair of connecting tabs 31 projecting beneath base 13 when a seating portion 33 of bar 29 is positioned therein.

Means 27 includes a pair of spaced-apart spring contact members 35 and 37 which each have a first end 39 securely mounted within base 13. As shown in FIGS. 1 and 2, ends 39 each include a tubular portion 40 which passes through base 13. Portions 40 are each adapted for being joined (e.g. via wiring) to the above described power source. Each contact is downwardly depressed by a respective projecting electrode (e.g. electrode 23 depresses contact 35, etc.) Accordingly, a second end 41 of each contact exerts a positive, upward biasing force against the respective electrode when flash tube 19 and reflector 15 are positioned as shown in FIGS. 1 and 2.

Means 17 mounting reflector 15 comprises a pair of spaced apart retention members 43 which each include a pair of upstanding engagement arms 45 for positively retaining the reflector. The end portions of arms 45 are adapted for inserting within corresponding spaced openings 47 located in reflector 15.

In order to position trigger bar 29 within reflector 15, a longitudinal slot 49 is provided at the apex of the reflector. Slot 49 is therefore located immediately adjacent and with access to that portion of envelope 21 within the reflector. Reflector 15 also includes first and second spaced apart apertures 51 which each contain an electrically insulative bushing 53 therein. Bushings 53 engage the exterior surface of envelope 21 when tube 19 is located therein.

Thus there has been shown and described a unique flash assembly which is capable of utilizing a high voltage arc discharge flash tube not requiring a conductive film or wrapped trigger wire thereon. It is understood, however, that assembly 10 is also capable of using a flash tube having a conductive film thereabout, should such a film be desired. Assembly and disassembly of the invention is facilitated by the design illustrated in the drawings. With further regard to the invention, the assembly may be readily positioned within and removed from a corresponding camera or associated power pack. The necessary electrical connections between the invention's trigger bar and contact members are the respective power sources may easily be provided utilizing electrical wiring. It is of course also possible to provide the camera with a suitable connector into which base 13 may be inserted.

The preferred material for base 13 is a phenolic or other suitable plastic with appropriate insulative properties while contacts 35 and 37 are rhodium-plated copper. Trigger bar 29 is also preferably of rhodium-plated copper and reflector 15 is metallized Lexan. Envelope 21 is of a vitreous material (e.g. borosilicate or aluminosilicate glass) and electrodes 23 and 25 are tungsten.

While there have been shown and described what are at present considered the preferred embodiments of the invention, it will be obvious to those skilled in the art that various changes and modifications may be made therein without departing from the scope of the invention as defined by the appended claims.

What is claimed is:

1. A flash assembly comprising:
    an electrically insulative base;
    a reflector spacedly positioned from said base and including a longitudinal slot within the apex thereof;
    means for mounting said reflector at said spaced position from said base;
    a high voltage, arc discharge flash tube including an elongated, light-transmitting envelope and a pair of arc-supporting electrodes spaced apart within said envelope and projecting from opposing ends thereof, at least a portion of said envelope positioned within said reflector, said longitudinal slot within said reflector located adjacent said envelope;
    means for electrically connecting said electrodes of said flash tube to a power source located externally of said flash assembly; and
    an elongated trigger bar positioned within said longitudinal slot within said reflector and adjacent said envelope of said flash tube for applying an electrical pulse sufficient to initiate discharge of an arc between said electrodes, said trigger bar adapted for being electrically connected to a high voltage power source positioned externally of said flash assembly and capable of supplying said electrical pulse to said trigger bar, said trigger bar applying said electrical pulse to said flash tube through said longitudinal slot.

2. The flash assembly according to claim 1 wherein said means for electrically connecting said electrodes to said power source comprises a pair of spaced apart contact members, each of said contact members having a first end securedly retained within said base and a second end resiliently engaging a respective one of said electrodes projecting from said envelope 3. The flash assembly according to claim 1 wherein said means for mounting said reflector comprises a pair of spaced apart retention members each securedly positioned within said base and having at least one end portion positively engaged to said reflector.

4. The flash assembly according to claim 3 wherein said reflector includes a plurality of spaced openings therein, said end portions of said retention members positioned within said openings.

5. The flash assembly according to claim 1 wherein said trigger bar includes a seating portion seated within said base.

6. The flash assembly according to claim 1 wherein said reflector includes first and second spaced apart apertures therein, said envelope of said flash tube located within said apertures.

7. The flash assembly according to claim 6 further including an insulative bushing member within each of said spaced apart apertures, each of said bushing members positioned about said envelope.

8. The flash assembly according to claim 1 wherein said reflector comprises a plastic member and a light-transmitting cover, said plastic member and cover defining a singular, elongated chamber within said reflector.

* * * * *